No. 734,812. PATENTED JULY 28, 1903.
J. F. BUSH.
FILTER OR SCREEN FOR SERVICE PIPES.
APPLICATION FILED JULY 11, 1902.
NO MODEL.
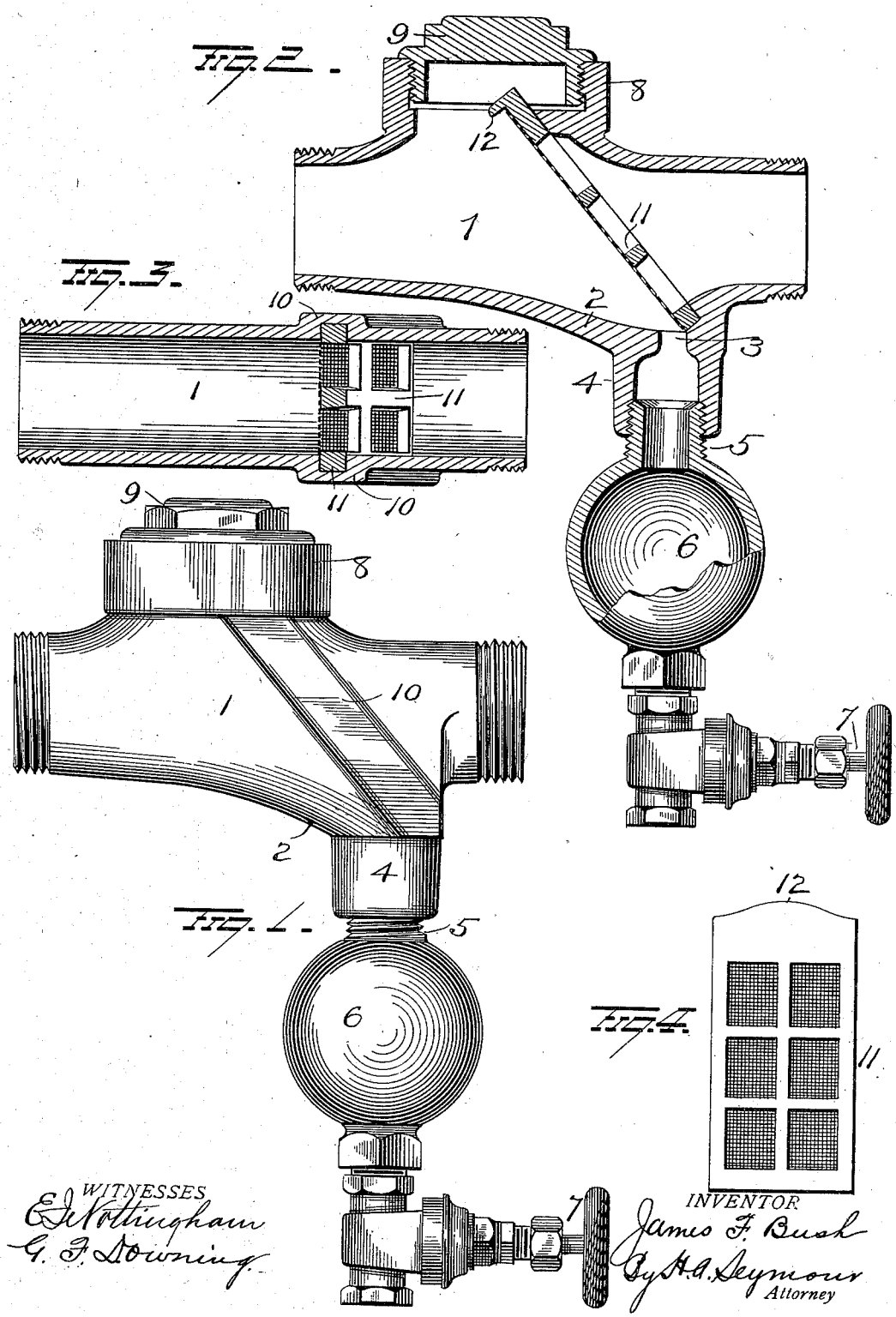
INVENTOR
James F. Bush
By H. A. Seymour
Attorney
WITNESSES No. 734,812. Patented July 28, 1903.

UNITED STATES PATENT OFFICE.

JAMES F. BUSH, OF WATERVILLE, MAINE.

FILTER OR SCREEN FOR SERVICE-PIPES.

SPECIFICATION forming part of Letters Patent No. 734,812, dated July 28, 1903.

Application filed July 11, 1902. Serial No. 115,141. (No model.)

*To all whom it may concern:*

Be it known that I, JAMES F. BUSH, a resident of Waterville, in the county of Kennebec and State of Maine, have invented certain new and useful Improvements in Filters or Screens for Service-Pipes; and I do hereby declare the following to be a full, clear, and exact description of the invention, such as will enable others skilled in the art to which it appertains to make and use the same.

My invention relates to an improved filter or screen for service-pipes, the object of the invention being to prevent the passage of sand and dirt to the service-point, accumulate the foreign matter, and blow it out at will by the stream of water without disconnecting any portion of the service-pipes.

With this object in view the invention consists in certain novel features of construction and combinations and arrangements of parts, as will be more fully hereinafter described, and pointed out in the claims.

In the accompanying drawings, Figure 1 is a view in elevation. Fig. 2 is a view in vertical longitudinal section. Fig. 3 is a view in horizontal longitudinal section, and Fig. 4 is a view of the screen removed.

1 represents that portion of the service-pipe constituting the screen-casing, which is of the shape shown, having a depending portion 2, in which an opening 3 is provided into an internally-screw-threaded nipple 4, and an externally-screw-threaded nipple on a bulb 6 is screwed into nipple 4, the outlet end of said bulb being provided with a suitable valve 7 to permit the blowing off of the sand and dirt collected in the bulb, as will hereinafter appear. The top of casing 1 is made with a large opening surrounded by an internally-screw-threaded flange 8, into which a plug 9 is screwed to close said opening.

The casing 1 is cast with inclined parallel grooves or guides 10 in opposite sides, extending from the opening in the top to a point at one side of nipple 5, and in these guides my improved screen 11 is located and supported in an inclined position, as shown. The lower end of the screen is located over nipple 5 to compel sand and dirt caught thereby to pass down through the nipple into bulb 6 and collect therein. The screen 11 comprises a metal plate having openings therein, and to one face of the plate a wire-netting of any desired mesh is secured, thus compelling all water passing through the casing to pass through the screen, and the upper end of the screen-plate is provided with a lip 12 to facilitate the removal thereof through the opening in the top of the casing when occasion may require this to be done.

The operation of my improvement is as follows: The sand and dirt in the water are stopped by screen 11 and gravitate or settle into bulb 6, and when it is desired to clean the latter it is simply necessary to open valve 7, when the water rushing through the contracted nipple into and through the bulb will carry with it the accumulation of sand and dirt. The valve can then be closed and the sand permitted to again collect in the bulb.

While my improvements are especially adapted for use in connection with paper-pulp machines, they may be employed for various other purposes, and hence I do not limit myself to any particular use.

A great many changes might be made in the general form and arrangement of the several parts described without departing from my invention, and hence I do not wish to be limited to the precise construction set forth, but consider myself at liberty to make such slight changes and alterations as fairly fall within the spirit and scope of my invention.

Having fully described my invention, what I claim as new, and desire to secure by Letters Patent, is—

1. The combination with a service-pipe having a contracted opening in its wall, an enlarged chamber below the service-pipe and communicating with said service-pipe through said contracted opening in the wall thereof, a valved outlet for said enlarged chamber, and a diagonally-disposed screen in the service-pipe.

2. The combination with a service-pipe having a contracted opening in its wall, of a removable inclined screen across the same, a bulb below the pipe and communicating with the contracted opening in said pipe adjacent to the lower edge of the screen, and a valve at the outlet end of said bulb.

3. The combination with a service-pipe having an opening in its top, and parallel guides in its sides, a screen removably secured in said guides and a plug closing the opening and locking the screen in place, said service-pipe also having a contracted opening in its bottom wall, of a bulb communicating by said contracted opening with said pipe in advance of the screen and having a valved outlet.

In testimony whereof I have signed this specification in the presence of two subscribing witnesses.

JAMES F. BUSH.

Witnesses:
WILLIAM H. BOOKER,
LINWOOD M. HARRIMAN.